US008095264B2

(12) United States Patent
Tanigawa et al.

(10) Patent No.: US 8,095,264 B2
(45) Date of Patent: Jan. 10, 2012

(54) VEHICLE-MOUNTED INFORMATION SYSTEM, AND DATA GATHERING METHOD IN DIAGNOSTIC EQUIPMENT

(75) Inventors: Keiko Tanigawa, Yokohama (JP); Akitoshi Shimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 425 days.

(21) Appl. No.: 12/457,048

(22) Filed: May 29, 2009

(65) Prior Publication Data

US 2009/0299566 A1 Dec. 3, 2009

(30) Foreign Application Priority Data

May 30, 2008 (JP) ................................ 2008-141866

(51) Int. Cl.
*G06F 7/00* (2006.01)

(52) U.S. Cl. ............................ 701/33; 701/35; 701/115

(58) Field of Classification Search ............. 701/33–35, 701/115
See application file for complete search history.

(56) References Cited

U.S. PATENT DOCUMENTS 6,447,075 B2 * 9/2002 Ross et al. ...................... 303/20
6,463,373 B2 * 10/2002 Suganuma et al. ............ 701/48
6,694,235 B2 * 2/2004 Akiyama ........................ 701/33
6,728,611 B2 * 4/2004 Kamiya .......................... 701/33
6,981,176 B2 * 12/2005 Fruehling et al. ............... 714/11
7,275,181 B2 * 9/2007 Staiger ............................ 714/13
7,467,035 B2 * 12/2008 Sayce-Jones ................... 701/36
7,813,852 B2 * 10/2010 Kato et al. ...................... 701/35
2001/0037168 A1 * 11/2001 Hozuka et al. .................. 701/29
2002/0077739 A1 * 6/2002 Augsburger et al. ......... 701/115
2008/0021607 A1 1/2008 Kato et al.
2010/0256860 A1 * 10/2010 Yamada .......................... 701/32
2010/0332072 A1 * 12/2010 Ishiko et al. .................... 701/30

FOREIGN PATENT DOCUMENTS

JP 2003-019931 7/2001
JP 2008-012974 7/2006
JP 2008-24015 7/2006
JP 2009-51345 8/2007

* cited by examiner

*Primary Examiner* — Drew Brown
(74) *Attorney, Agent, or Firm* — Stites & Harbison PLLC; Juan Carlos A. Marquez, Esq.

(57) ABSTRACT

A diagnostic equipment coupled to a vehicle network makes an inquiry about internal information, e.g., yes or no whether there is a logging-available memory area, with respect to each of a plurality of ECUs, and only to any of the ECUs making a response of yes, e.g., having such a memory area, a notification is made when some defect is observed. The internal information is then gathered from the ECU, and in response to an inquiry about the internal information coming from the diagnostic equipment, the ECU forwards back information about yes or no for logging thereto. When the ECU is available for logging, log data that has been periodically accumulated is forwarded back as a response with respect to a retrieval request therefor from the diagnostic equipment.

8 Claims, 11 Drawing Sheets

FIG. 11

1100

| ECU-ID (1101) | YES OR NO FOR LOGGING (1102) | THE NUMBER OF SECONDS BEFORE LOGGING TRIGGER (1103) | THE NUMBER OF SECONDS AFTER LOGGING TRIGGER (1104) | SAMPLING PERIOD (1105) | SAMPLING DATA LENGTH (1106) |
|---|---|---|---|---|---|
| #1 | ○ | 12s | 8s | 100ms | 8Byte |
| #2 | × | 15s | 5s | 10ms | 64Byte |
| ... | ... | ... | | ... | ... |

VEHICLE-MOUNTED INFORMATION SYSTEM, AND DATA GATHERING METHOD IN DIAGNOSTIC EQUIPMENT

INCORPORATION BY REFERENCE

This application claims priority based on a Japanese patent application, No. 2008-141866 filed on May 30, 2008, the entire contents of which are incorporated herein by reference.

BACKGROUND

The present invention relates to a vehicle-mounted network system and, more specifically, to a system that provides means for gathering data from an ECU (electronic control unit) in a diagnostic equipment.

A vehicle system is of an autonomous decentralized type in which an ECU coupled to a vehicle network broadcasts information needed for any other ECUs, and operates to capture any information needed for its own. Information technology (IT) has been progressing to the field of vehicles, e.g., a large number of ECUs achieve their cooperative control through exchange of vehicle control information over a vehicle network. With the improvement of performance in the vehicles, the number of the ECUs for mounting to the vehicles is increased, and thus data flowing over the network is also increased in amount. The concern here is that the vehicle network generally used, i.e., CAN (Control Area Network), has a limitation of the number of units for coupling thereto, and with the increase of the number of the ECUs as such for mounting to the vehicles, the network resultantly becomes complicated in configuration. This thus results in a difficulty in isolating problems and specifying the cause of a defect, if occurred.

In consideration of such background circumstances, a data recorder for gathering and recording the vehicle control information flowing over the vehicle network is considered useful. With such a data recorder, the gathered vehicle control information is used for defect analysis.

SUMMARY OF THE INVENTION

For specifying any defective portion, Patent Document 1 (JP-A-2003-19931) describes a technology for performing a data request/response process between a vehicle management unit and an ECU. The problem with such a technology is the increase of the load of an in-vehicle network. Moreover, when the ECU is defective, there is a possibility of needless data transmission to the network. If this is the case, exchange of data needed for vehicle control cannot be completed correctly between the ECU and others, thereby possibly causing troubles for running of the vehicle.

Also for specifying any defective portion, Patent Document 2 (JP-A-2008-12974) describes a technology for monitoring control information for use by a diagnostic equipment. When any defect is detected, the control information is accumulated for a predetermined length of time, and at the same time, a key frame is transmitted to notify the occurrence of a defect to a plurality of ECUs, and the ECUs each accumulate therein sensor information for its own. By storing such sensor information originally having no need for transmission over the network in the ECUs, any data useful for defect diagnosis can be indeed stored in the vehicle while the load of the network is being suppressed. However, not all of the ECUs in the vehicle have a memory enough for accumulating therein the sensor information as such, thereby possibly requiring to modify the hardware and software configurations.

The disclosed system provides a device and method for accumulating internal information for defect diagnosis use either in a plurality of ECUs or a diagnostic equipment depending on whether or not the ECUs each have a memory area for accumulation of the internal information, and after a defect determination, gathering the internal information accumulated in the ECUs for accumulation in the diagnostic equipment.

The disclosed system is directed to a diagnostic equipment coupled to an in-vehicle network, making an inquiry about internal information (e.g., whether or not there is a memory area available for logging) with respect to each of a plurality of ECUs, and when any of the ECUs forwarding back a response of "memory area yes" is determined as being defective, notifying a defect message, and gathering the internal information from any of the ECUs that has been logged with the internal information.

According to the teaching herein, the diagnostic equipment coupled to the in-vehicle network makes an inquiry about internal information (e.g., whether or not there is a memory area available for logging) with respect to each of a plurality of ECUs, and when any of the ECUs forwarding back a response of "memory area yes" is determined as being defective, notifies a defect message, and gathers the internal information from any of the ECUs that has been logged with the internal information. With such a configuration, the load of the in-vehicle network can be successfully reduced, and any data needed for defect diagnosis can be favorably gathered.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 11 shows an exemplary configuration of a log data accumulation table under the management of the diagnostic equipment in the embodiment.

DETAILED DESCRIPTION OF THE EMBODIMENT

By referring to FIGS. 1 to 11, examples are described.

Figure 1:
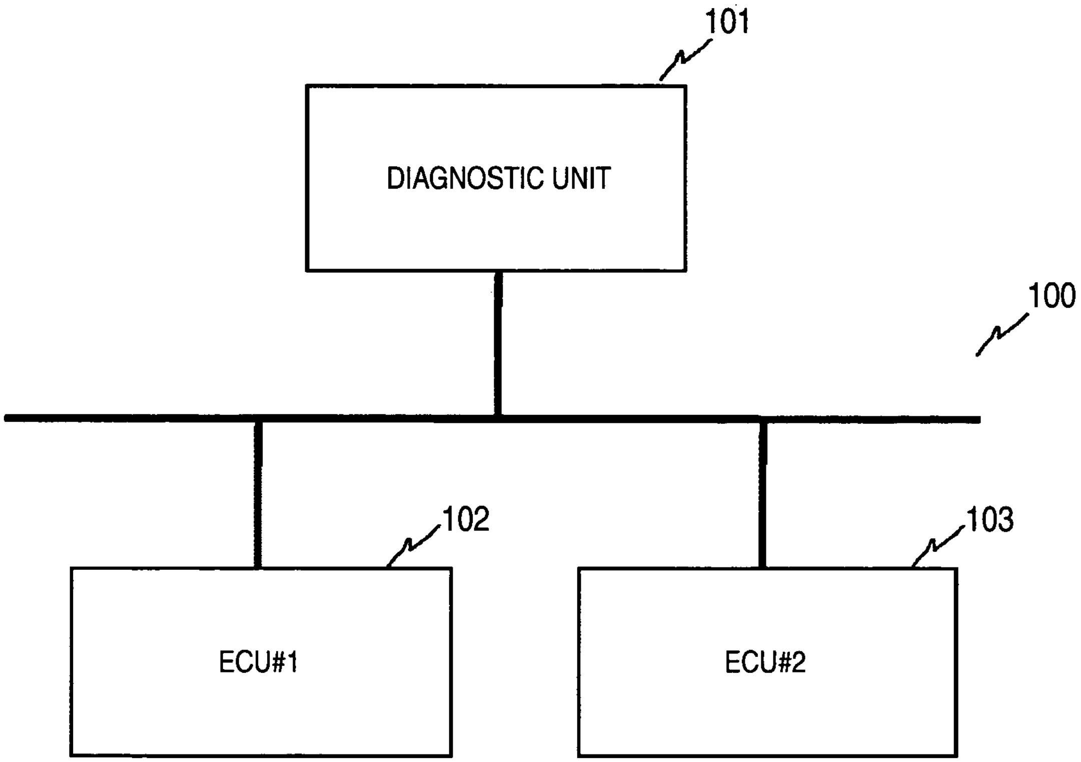
FIG. 1 is a diagram showing the entire configuration of a vehicle-mounted information system in an embodiment.

FIG. 1 shows an exemplary configuration of a vehicle system in an embodiment.

A diagnostic equipment 101 is coupled to ECUs 102 and 103 over a vehicle network 100. The ECUs 102 and 103 exchange control information with each other over the vehicle network 100. When the ECU 102 is an engine controller unit, and when the ECU 103 is an AT (Automatic Transmission) controller unit, for example, the ECU 103 forwards an AT shift signal as the control information, and upon reception of the signal, the ECU 102 controls the engine in terms of the rotation frequency. The vehicle network is exemplified by CAN (Controller Area Network).

The ECUs 102 and 103 each have a unit identifier for identification thereof. In FIG. 1 example, the unit identifier of the ECU 102 is ID#1, and the unit identifier of the ECU 103 is ID#2. The diagnostic equipment 101 periodically accumulates control information thereinto or into a nonvolatile storage unit coupled thereto. The control information herein is the one to be exchanged between the ECUs 102 and 103. The diagnostic equipment 101 then determines whether or not the vehicle is defective using a data value included in the accumulated control information, a self-diagnostic code provided for any other defect diagnosis, and others. The type of the control information for accumulation and that of the data for such defect diagnosis use are set in advance in the diagnosis device 101. On the other hand, the ECUs 102 and 103 each periodically accumulate sensor information therein or in a nonvolatile storage unit coupled thereto. The sensor information is the one for use to control any control-target unit coupled to each of the ECUs 102 and 103, e.g., actuator and sensor, and the one acquired from any control-target unit such as sensor.

Figure 2:
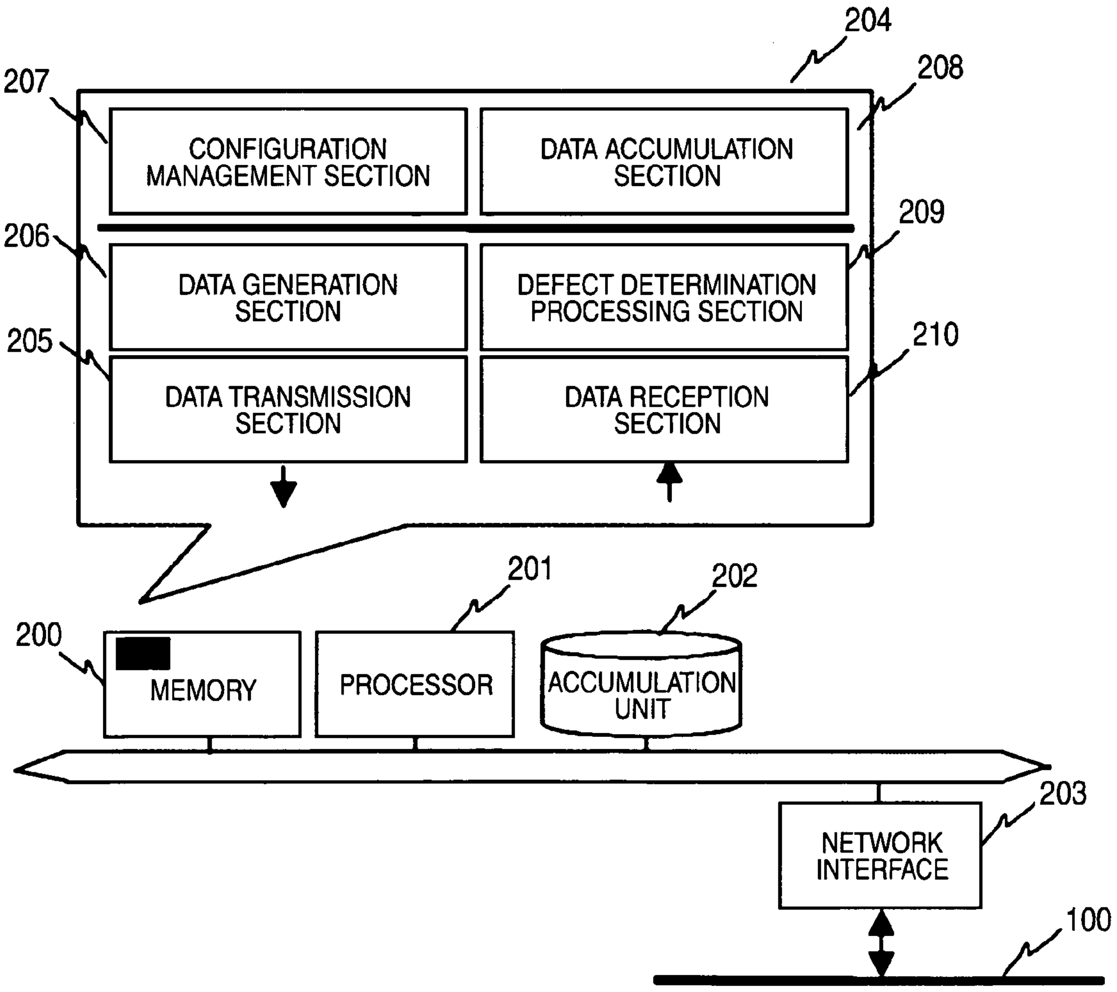
FIG. 2 is a diagram showing an exemplary internal configuration of a diagnostic equipment in the embodiment.

FIG. 2 shows the internal configuration of the diagnostic equipment 101.

In FIG. 2, the diagnostic equipment 101 is configured to include a memory 200, a processor 201, an accumulation unit 202, a network interface 203, and a diagnostic program 204. The memory 200 stores therein the diagnostic program 204, and the processor 201 executes processes based on the program in the memory 200. The network interface 203 is provided for communications over the vehicle network 100, and the diagnostic program 204 is expanded in the memory 200. Such modules are coupled together via an internal bus. The diagnostic program 204 expanded in the memory 200 is configured to include a data transmission section 205, a data generation section 206, a data reception section 210, a configuration management section 207, a data accumulation section 208, and a defect determination processing section 209. The data reception section 210 serves to receive control data flowing over the vehicle network 100, and any other data for defect diagnosis use, and accumulates the received data in the data accumulation section 208. Prior to accumulation of the data as such, a timestamp provided to the diagnostic equipment 101 is assigned. Which control data is to be accumulated is described in advance in the program or in a setting file, and any control data not being the target for accumulation is discarded. The defect determination processing section 209 determines whether or not any defect is observed in the control data and the data for defect determination use both accumulated in the data accumulation section 208. The logic for such a defect determination is described in advance in the program or in the setting file. When detecting any defect from the control information and the defect-determination-use data accumulated in the data accumulation section 208, the defect determination processing section 209 creates a defect notification in the data generation section 206 with respect to the ECUs under the management of the configuration management section 207, and the data transmission section 205 forwards the resulting defect notification to the vehicle network 100. When the defect is observed as such, the data accumulated in the data accumulation section 208 is recorded onto the accumulation unit 202.

Figure 3:
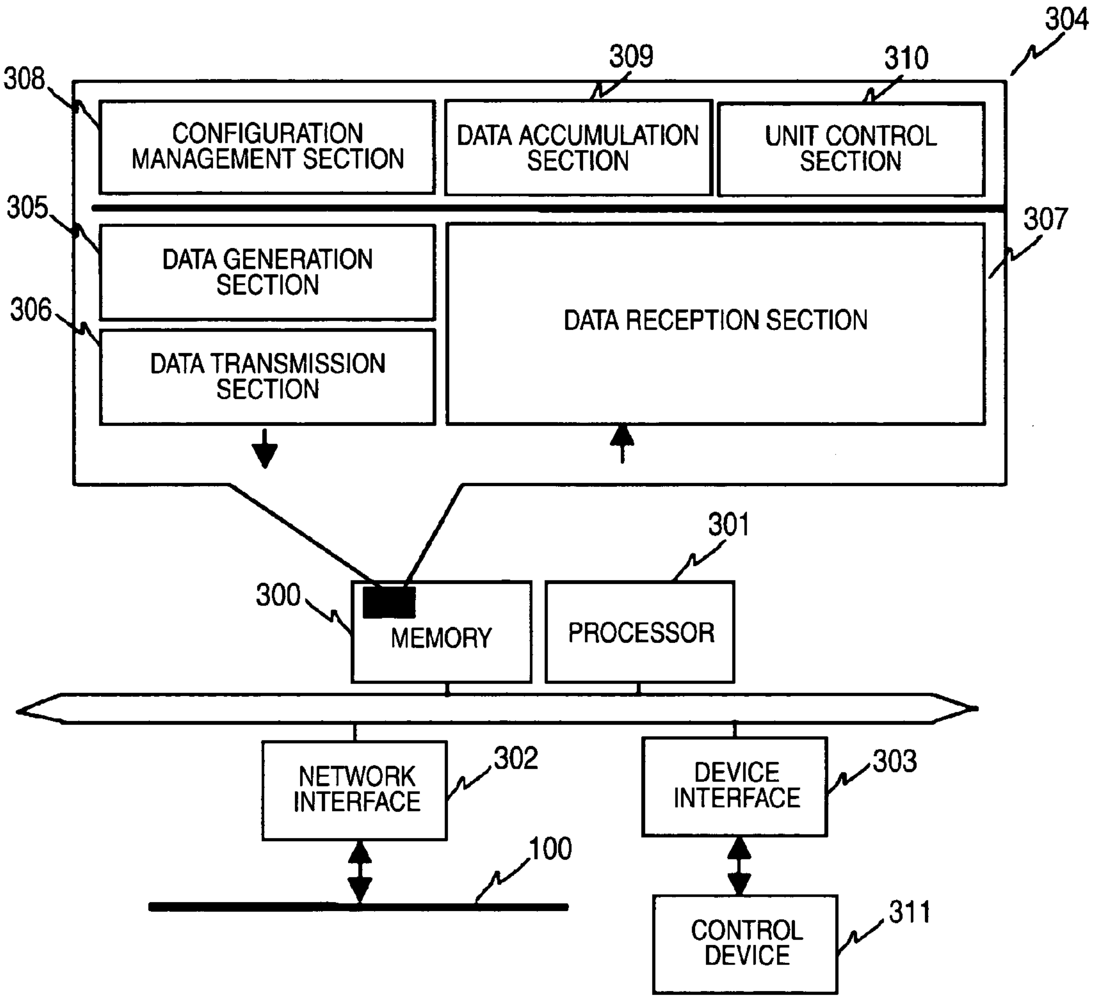
FIG. 3 is a diagram showing an exemplary internal configuration of an ECU in the embodiment.

FIG. 3 shows the internal configuration of the ECUs 102 and 103.

In FIG. 3, the ECUs 102 and 103 are each configured to include a memory 300, a processor 301, a network interface 302, an external device interface 303, and a diagnostic program 304. The memory 300 stores therein the diagnostic program 304, and the processor 301 executes processes based on the program in the memory 300. The network interface 302 is provided for communications over the vehicle network 100, and the external device interface 303 is provided for coupling with a control device 311 such as actuator and sensor under the control of the ECU. The diagnostic program 304 is expanded in the memory 300. Such modules are coupled together via an internal bus. The diagnostic program 304 expanded in the memory 300 is configured to include a data generation section 305, a data transmission section 306, a data reception section 307, a configuration management section 308, a data accumulation section 309, and a unit control section 310. The data accumulation section 309 accumulates the data for storage therein for its own, the log data that will be transmitted later to the diagnostic equipment 101 for defect diagnosis use, and others. When the data accumulation section 309 does not have an area, i.e., capacity, for temporarily storing such log data for defect diagnosis use, the capacity of being able to store only the internal data of its own will do. That is, for the data accumulation section 309, the accumulation of the internal data into itself comes first over the temporary accumulation of the log data for defect diagnosis use. The program or the setting file describes in advance therein which data is to be accumulated in which format. The data transmission section 306 creates, in the data generation section 305, control data and response data for transmission to the vehicle network 100 via the network interface 302. The control data here is the one under the control and management of the data transmission section 306, and the response data is the one to be forwarded as a response against any data provided from other ECUs. The data reception section 307 receives the control data flowing over the vehicle network 100, and a request message issued thereto, and in accordance with the identifier of the provided data, allocates the data to the configuration management section 308 or to the unit control section 310. The configuration management section 308 manages, in the data accumulation section 309, information about the log data to be transmitted later to the diagnostic equipment 101 for defect diagnosis use. Such information includes yes or no whether there is an area available for temporary accumulation of the log data, a sampling data length of the log data, a sampling period, and the number of seconds allowed for data accumulation, for example.

Figure 4:
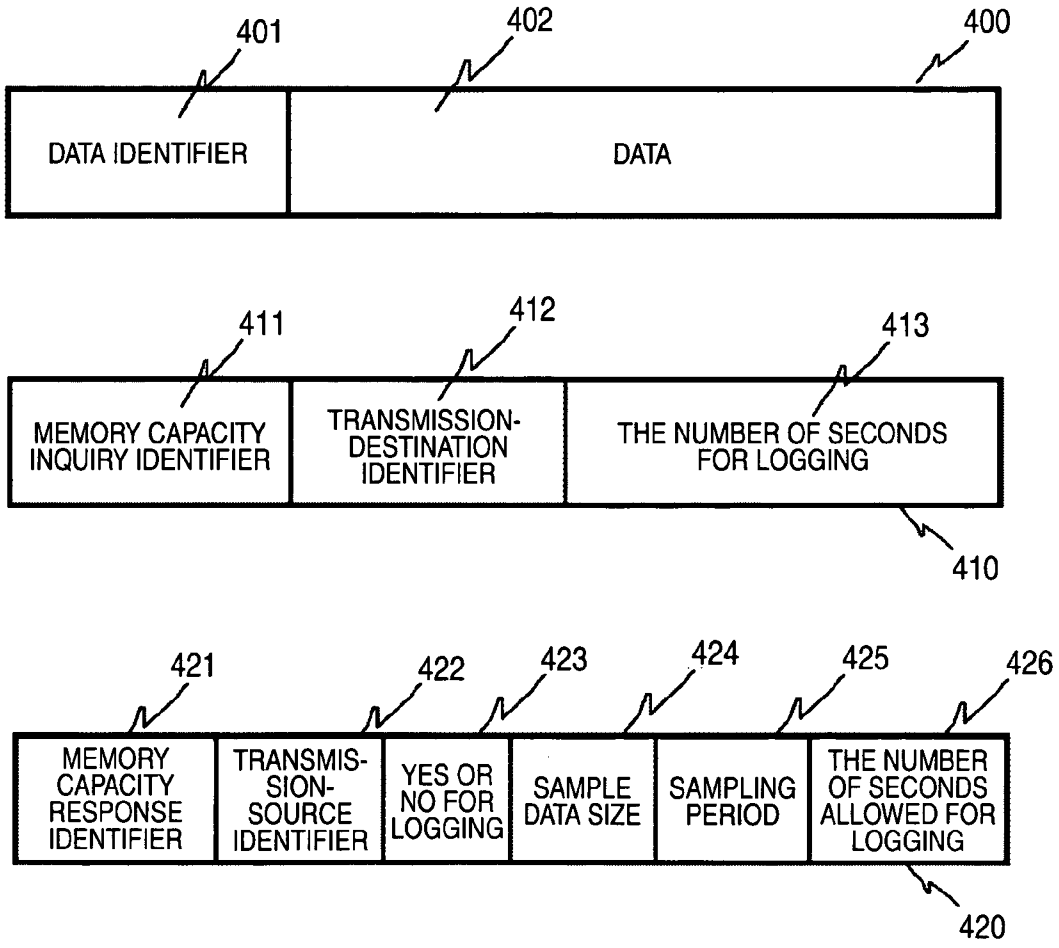
FIG. 4 shows an exemplary message format in the embodiment.
Figure 5:
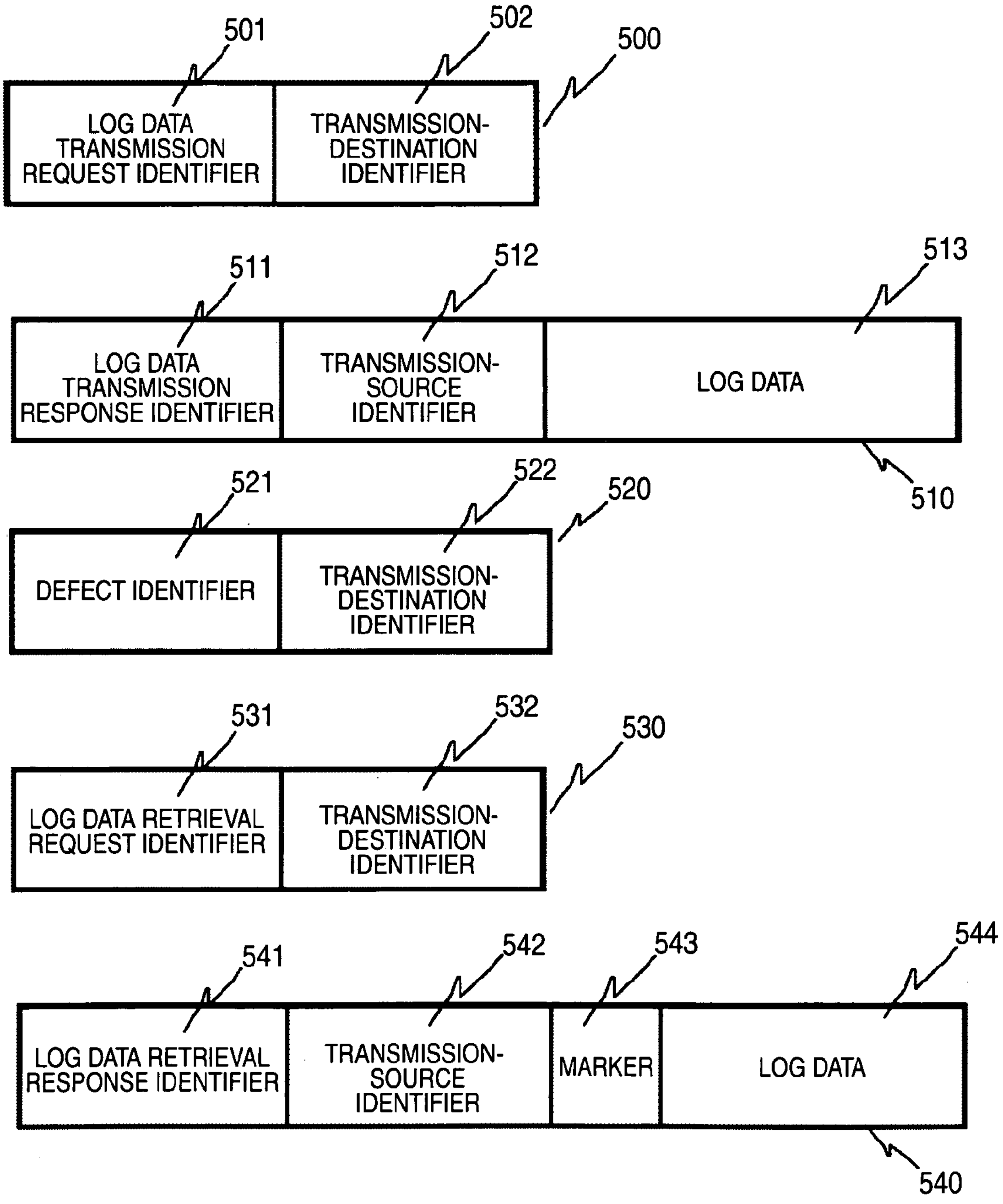
FIG. 5 shows another exemplary message format in the embodiment.

FIGS. 4 and 5 each show an exemplary message format to be exchanged between the diagnostic equipment 101 and the ECU 102 or 103.

In FIG. 4, a reference numeral 400 denotes a default format for various types of messages. A reference numeral 401 denotes an identifier for use to identify any of the messages or the type thereof, and a reference numeral 402 denotes data to be identified by the identifier 401. Messages 410 and 420 are each a message for acquiring information about whether or not the diagnostic equipment 101 can store the log data for use with defect diagnosis in the ECUs. Specifically, the message 410 is a request message for use by the diagnostic equipment 101 to make an inquiry, to the ECUs 102 and 103, about configuration information related to the memory area for the log data for defect diagnosis use. A reference numeral 411 denotes an identifier indicating that it is a memory capacity inquiry message, a reference numeral 412 denotes an identifier of each of the ECUs 102 and 103 being the transmission destination of the memory capacity inquiry message, and a reference numeral 413 denotes the number of seconds of the log data on the request. The number of seconds of log data 413 may indicate the sum of the seconds before and after when some defect is determined as occurring, or may separately indicate the seconds before such a determination and the seconds thereafter. As an alternative to the number of seconds, the number of seconds of log data 413 may indicate the number of pieces of data, or the frequency of sampling. The message 420 is a memory capacity response message to be issued by each of the ECUs 102 and 103 after the reception of the message 410. A reference numeral 421 is an identifier indicating that it is the memory capacity response message, and a reference numeral 422 denotes an identifier of each of the ECUs 102 and 103 being the transmission source of the message. A reference numeral 423 denotes yes or no whether there is a memory area for the log data for use with defect diagnosis, and a reference numeral 424 denotes a sample data size of the log data. A reference numeral 425 denotes a sampling period of the log data, and a reference numeral 426 denotes the number of seconds required for storage of the log data.

In FIG. 5, messages 500 and 501 are each a message for gathering, in the diagnostic equipment 101, the log data in response to an inquiry thereabout and/or a response thereto with respect to the ECU(s) being an accumulation target of the log data. The message 500 is a log data transmission request message to be transmitted from the diagnostic equipment 101 to the ECU(s). A reference numeral 501 denotes an identifier indicating that the message is the log data transmission request message, and a reference numeral 502 denotes an identifier indicating the ECU(s) being the transmission destination of the message. A message 510 denotes a log data transmission response message, which is to be transmitted from the ECU(s) having received the message 500 to the diagnostic equipment 101. A reference numeral 511 denotes an identifier indicating that the message is a log data transmission response message, a reference numeral 512 denotes an identifier indicating the ECU being the transmission source of the message, and a reference numeral 513 denotes the log data. A message 520 is a defect notification to be transmitted when the diagnostic equipment 101 determines that some defect is occurring. A reference numeral 521 denotes an identifier indicating that the message is the defect notification, and a reference numeral 522 denotes an identifier of the ECU being the transmission destination of the message. Messages 530 and 540 are each a message to be exchanged between the diagnostic equipment 101 and the ECU(s) having responded thereto as carrying the log data, and are each used to retrieve the log data stored in the ECU(s). The message 530 is a log data retrieval request message to be transmitted from the diagnostic equipment 101 to the ECU(s). A reference numeral 531 denotes an identifier indicating that the message is the log data retrieval request message, and a reference numeral 532 denotes an identifier indicating the ECU being the transmission destination of the message. A reference numeral 540 denotes a log data retrieval response message to be transmitted from the ECU(s) having received the message 530 to the diagnostic equipment 101. A reference numeral 541 denotes an identifier indicating that the message is the log data retrieval response message, and a reference numeral 542 denotes an identifier indicating the ECU being the transmission source of the message. A reference numeral 543 denotes a marker indicating whether or not the defect notification is provided at the time of acquisition of the log data found in the message, and a reference numeral 544 indicates the log data.

FIGS. 6 to 9 each show the process flow of the diagnostic equipment 101, and FIG. 11 shows an exemplary log data accumulation table.

In FIG. 11, a log data accumulation table 1100 indicates whether or not the ECUs coupled to the vehicle network 100 are able to temporarily store the log data for defect diagnosis use. An element with a reference numeral 1101 indicates identifiers of the ECUs coupled to the vehicle network 100, and an element with a reference numeral 1102 indicates whether the ECU can store therein the log data or not. An element with a reference numeral 1103 indicates the number of seconds allowed for accumulation of the log data for later use with defect diagnosis before some defect is determined as occurring, and an element with a reference numeral 1104 indicates the number of seconds allowed for accumulation of the log data after such a defect determination. An element with a reference numeral 1105 indicates a sampling period of the log data, and an element with a reference numeral 1106 indicates a sampling data length of the log data.

Figure 6:
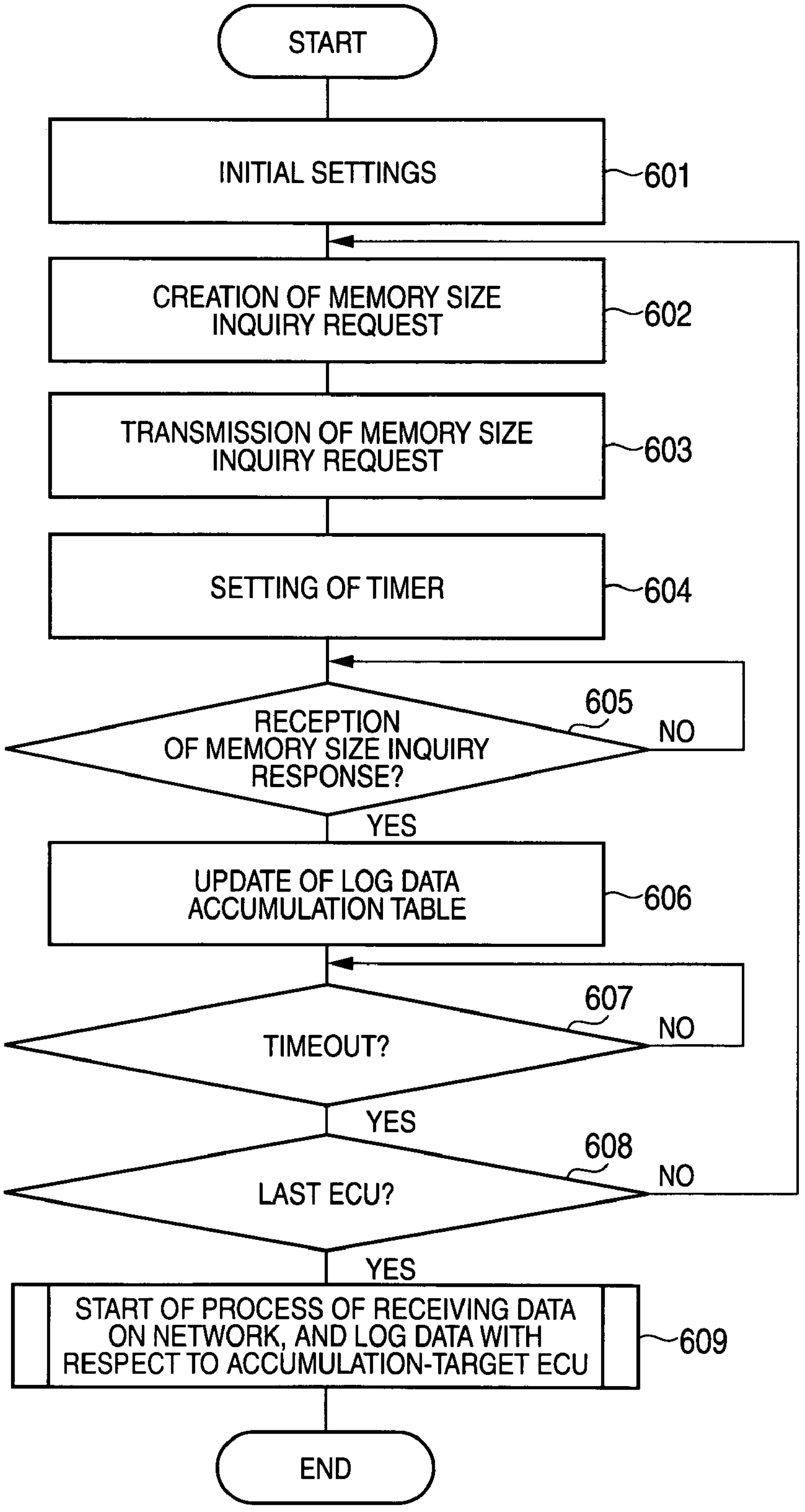
FIG. 6 shows an exemplary sequence of a memory capacity inquiry process by the diagnostic equipment with respect to ECUs in the embodiment.

FIG. 6 shows the flow of a process of, after the activation of the diagnostic equipment 101, to the ECUs 102 and 103 coupled to the vehicle network 100, making an inquiry about yes or no whether they carry the log data for defect diagnosis use. First of all, when the diagnostic program 204 is started to run, initial settings are made, e.g., reservation of memory needed for program processing, and reading of a setting file (step 601). To each of the ECUs described in the setting file as being coupled to the vehicle network 100, a memory size inquiry request is transmitted. That is, a memory size inquiry request message is created with the identifier of each of the ECUs provided thereon (step 602), and the resulting memory size inquiry request message is forwarded to the vehicle network 100 (step 603). A timer is then set to wait for the reception of a memory size inquiry response message (step 604), and until the timeout occurs, the memory size inquiry response message is waited to come (step 607). When the memory size inquiry response message is received (step 605), the log data accumulation table 1100 is written with various information found in the memory size inquiry response message, e.g., the identifier 422 of the ECU being the transmission source, the yes/no for logging 423, the log sample data size 424, the sampling period 425, the number of seconds for logging 426, and others, and after completion of the writing as such, the log data accumulation table 1100 is updated (step 606). After the transmission of the memory size inquiry request message to all of the ECUs acquired in the initial settings (step 608), a reception process is started for the data flowing over the vehicle network 100, and for the log data of the ECU(s) being the accumulation target, i.e., the ECU(s) having no storage area for the log data, and accumulating the defect-diagnosis-use log data in the diagnostic equipment 101 (step 609).

Figure 7:
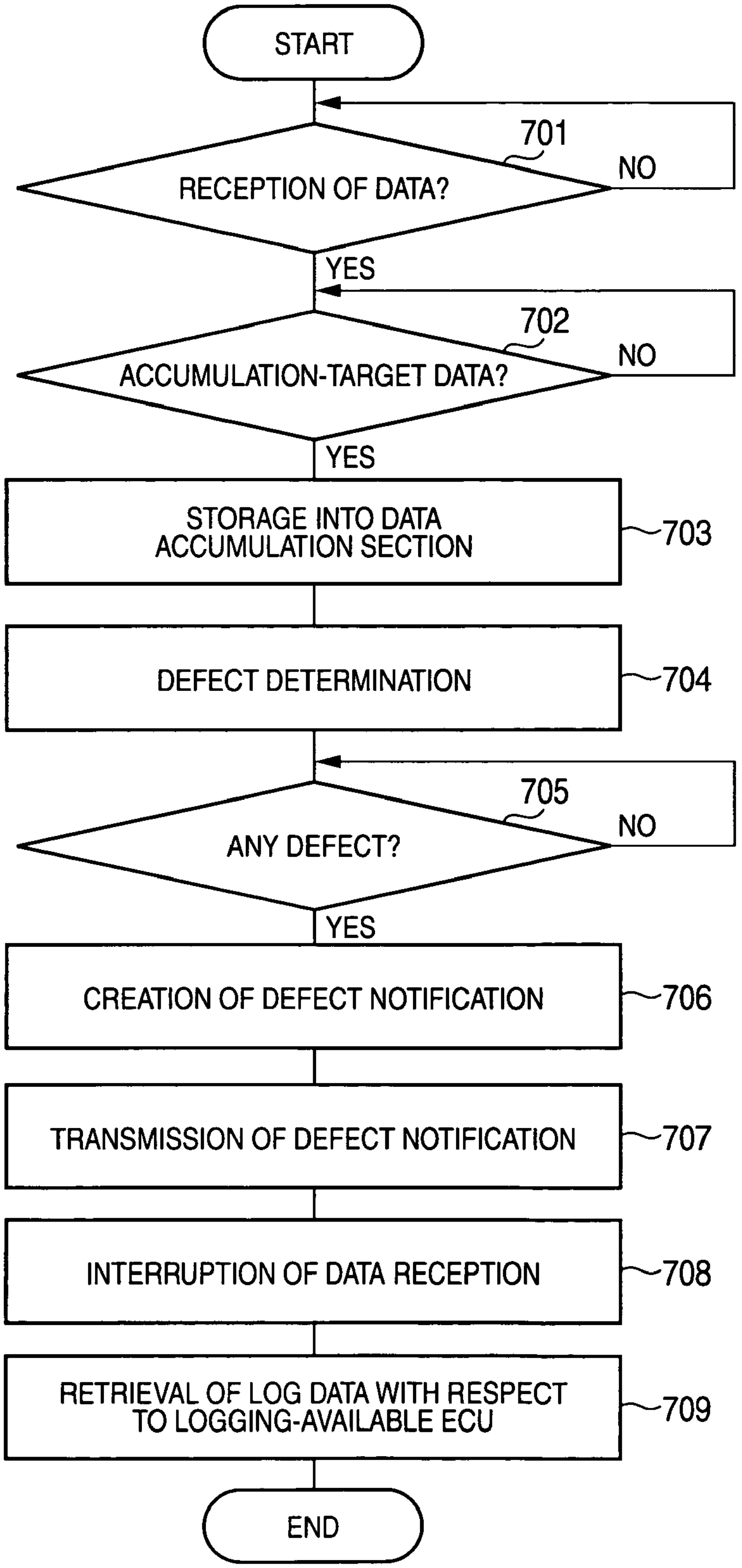
FIG. 7 shows an exemplary sequence of a defect determination process of the diagnostic equipment in the embodiment.

FIG. 7 shows the flow of a process for the diagnostic equipment 101 to receive the control data flowing over the vehicle network 100 and the data for defect diagnosis use, and based on such data, determine whether or not any defect is occurring. First of all, the diagnostic equipment 101 receives the data flowing over the vehicle network 100 (step 701), and using the setting information acquired in the initial settings, determines whether or not the received data is a target for accumulation in itself (step 702). For such a determination, a matching is made through comparison between the data identifier and the transmission-destination identifier in the setting information with those in the received data, for example. When a matching is observed therebetween, it means that the data is an accumulation target, and when no matching is observed therebetween, it means that the data is not an accumulation target. When the data is determined as being an accumulation target, the data is stored into the data accumulation section 208 (step 703). Using the data accumulated in the data accumulation section 208 and the setting information acquired in the initial settings, the defect determination processing section 209 determines whether or not any defect is occurring (step 704). For example, the data accumulated in the data accumulation section 208 is compared with a threshold value in the setting information, and when the data is determined as exceeding the threshold value, it means that some defect is occurring, and when the data is determined as not exceeding the threshold value, it means that the data is normal. When the determination is so made that some defect is occurring (step 705), the unit identifier of the ECU available for logging found in the log data accumulation table 1100, e.g., ECU-ID#1, is inserted into the transmission-destination identifier 522, and the defect notification (message 520) is created (step 706). The resulting defect notification is then forwarded to the logging-available ECU (step 707). The reception process for the data flowing over the vehicle network 100 is temporarily stopped (step 708), and with respect to the logging-available ECU found in the log data accumulation table 1100, a log data retrieval process is started (step 709).

Figure 8:
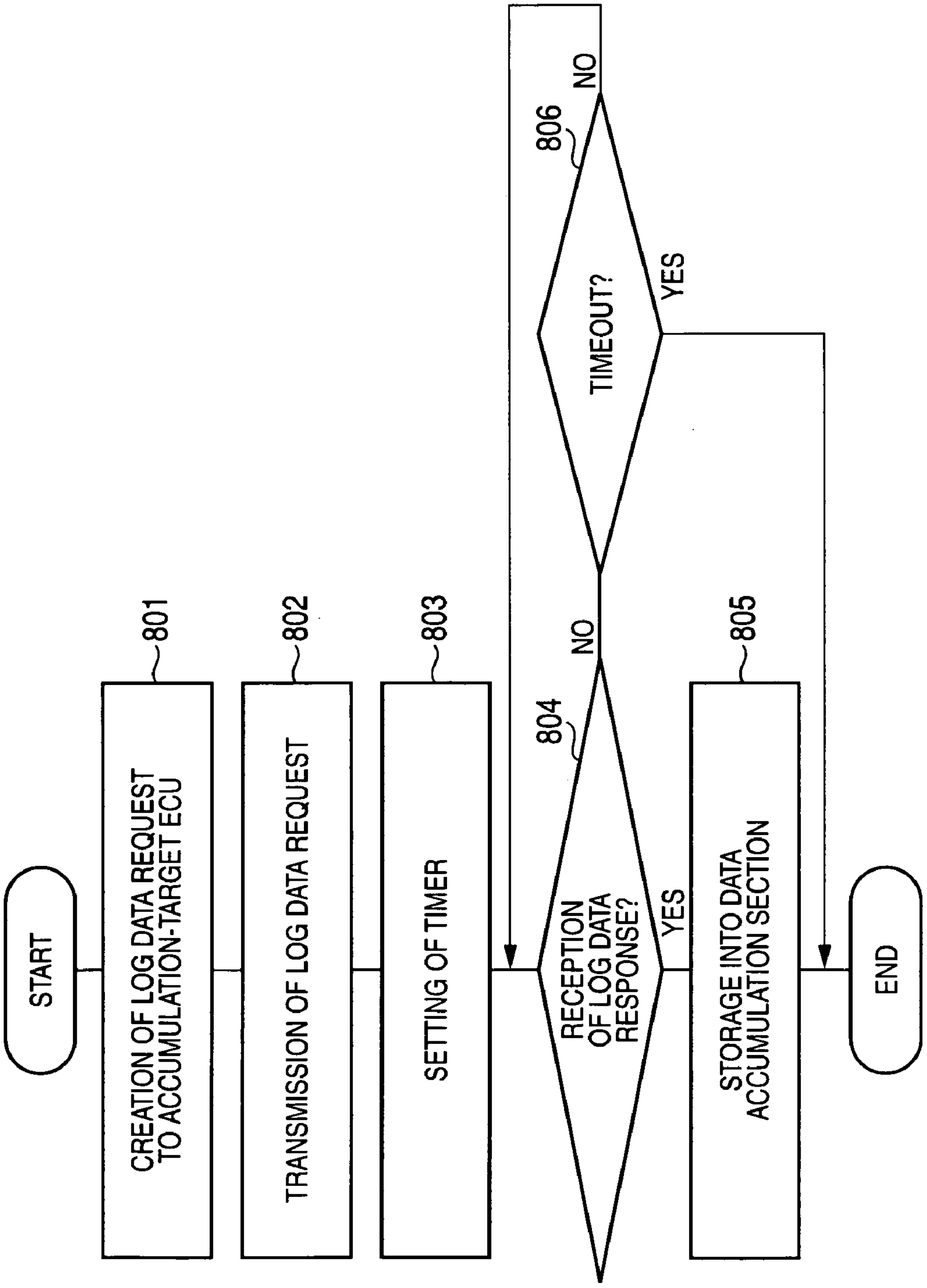
FIG. 8 shows an exemplary sequence of a process for the diagnostic equipment to gather log data from an ECU being a target for accumulating therein the internal information log data about the ECU in the embodiment.

FIG. 8 shows the flow of a process for the diagnostic equipment 101 to acquire and accumulate the log data in response to an inquiry thereabout and/or a response thereto with respect to any of the ECUs being an accumulation target of the log data. This process is executed periodically, i.e., in accordance with a log data gathering period described in advance in the setting file or in the log data accumulation table 1100, for example, for each of the ECUs being an accumulation target. First of all, the log data accumulation table 1100 is searched to acquire the identifier of the ECU being the accumulation target, and a log data transmission request message is created (step 801). With the log data accumulation table 1100 of FIG. 11 example, created is the log data transmission request message including the identifier #2 of the ECU 102. The resulting log data transmission request message is forwarded to the vehicle network 100 (step 802). A timer is then set (step 803), and a log data transmission response message is waited to come. When the log data transmission response message is received (step 804), the received log data transmission response message is stored in the data accumulation section 208 (step 805). When the timeout occurs, this process is ended, and the next timing for data gathering is waited to come (step 806).

Figure 9:
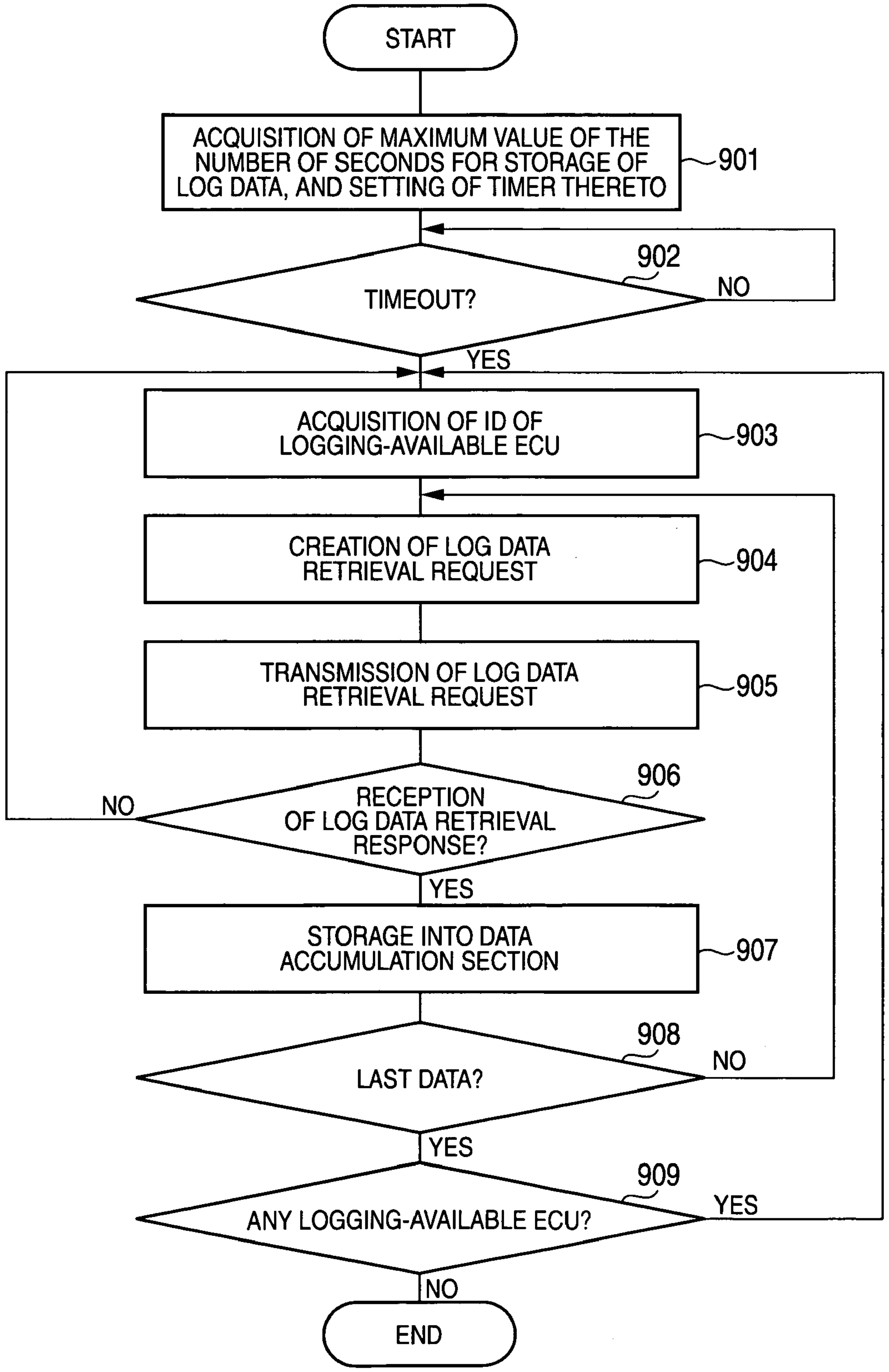
FIG. 9 shows an exemplary sequence of a process for the diagnostic equipment to retrieve the log data from the ECU that can log the internal information in the embodiment.

FIG. 9 shows the flow of a process for the diagnostic equipment 101 to retrieve and accumulate the log data in response to an inquiry thereabout and/or a response thereto with respect to any of the ECUs having the memory area for storage of the log data. This process is started to, after the log data stored in a certain ECU being a target is completely retrieved, retrieve and accumulate the log data from/into another ECU being the next target. In the log data accumulation table 1100, the element of "the number of seconds required for storage of log data 1104" is searched to find the maximum value thereof after a defect determination is made to each of the ECUs having the memory area for storage of the log data, and thus acquired maximum value is set to the timer (step 901). With the log data accumulation table 1100 of FIG. 11 example, the target ECU is the ECU 102 having the identifier of #1, and the number of the seconds after the defect determination is eight. Therefore, the timer is set to eight seconds, and the acquisition of any log data needed in the ECU 102 is waited to complete. As an alternative to the maximum value (eight seconds), a value larger than the maximum value, e.g., nine or ten seconds, may be set to the timer. After the timeout occurs (step 902), the log data accumulation table 1100 is searched to find one identifier of the logging-available target ECU (step 903), and a log data retrieval request message is created together with the identifier (step 904). The resulting message is transmitted to the vehicle network 100 (step 905). When a log data retrieval response message is provided from the ECU being the transmission destination of the log data retrieval request message (step 906), the message is accumulated in the data accumulation section 208 (step 907). A detection is then made whether or not the received log data retrieval response message includes any information indicating that this is the last data (step 908), and when the log data retrieval response message is the last data, the log data accumulation table 1100 is searched for any logging-available ECU. When such an ECU is found, a series of processes are executed with respect to the next target ECU (step 909). With such a process procedure, after confirming that the log data is retrieved from one logging-available target ECU (step 908), the procedure makes a request to the next logging-available target ECU for retrieval of the log data so that the load of the network can be favorably distributed at the time of retrieving the log data.

Figure 10:
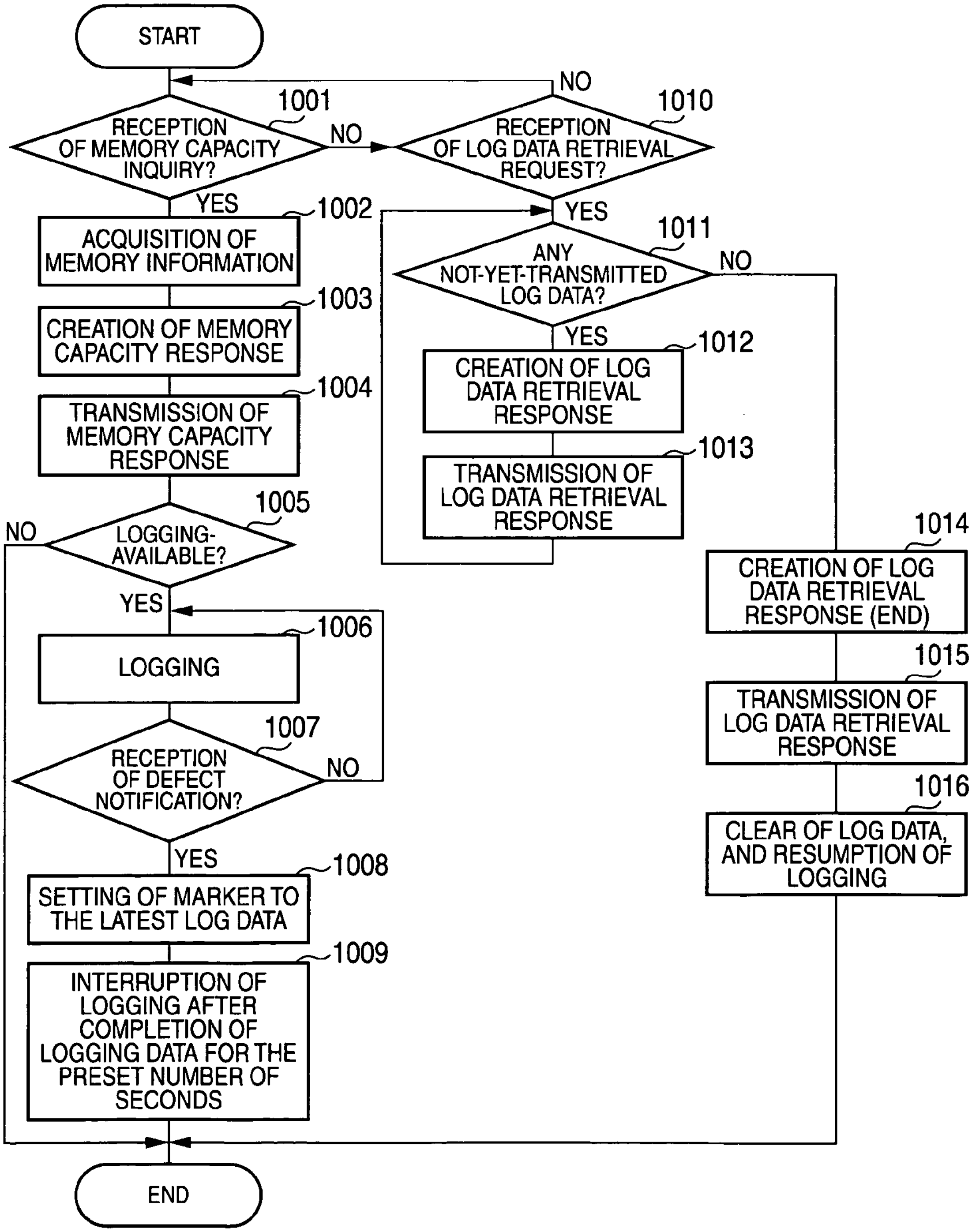
FIG. 10 shows an exemplary sequence of a diagnostic program related to defect diagnosis in the ECU in the embodiment.

FIG. 10 shows the process flow of the ECUs 102 and 103.

In FIG. 10, when the diagnostic program 304 is started to run, initial settings are made, e.g., reservation of memory needed for program processing, and reading of a setting file, and a memory capacity inquiry message is waited to come from the diagnostic equipment 101 (step 1001). The setting file includes such information as indicated in the log data accumulation table 1100, e.g., whether or not the log data for defect diagnostic use can be temporarily stored in the ECUs 102 and 103, the number of seconds allowed for accumulation of the log data, the sampling period, the sampling data length, and others. When the memory capacity inquiry message is received (step 1002), the memory information found in the setting file about the log data, e.g. yes or no for logging, the number of seconds for data accumulation, the sampling data format, the sampling period, the sampling data length, and others, is compared with the number of seconds for the log data found in the memory capacity inquiry message. When the memory information in the setting file indicates the number equal to or smaller than the number of seconds for accumulation allowed for storage in the ECUs 102 and 103, the memory capacity response message is created with the response of logging being possible. On the other hand, when the memory information in the setting file shows a request value equal to or larger than the number of seconds for accumulation allowed for storage in the ECUs 102 and 103, the memory capacity response message is created with the response of logging not being possible in the ECUs 102 and 103 (step 1003). The resulting message is forwarded to the vehicle network 100 (step 1004). When the determination in step 1002 is so made as logging being possible (step 1005), the sampling data is logged to the data accumulation section 309 at a predetermined sampling period (step 1006). When the defect notification is provided by the diagnostic equipment 101 (step 1007), a marker is set to the log data being the latest at the time to indicate that the defect notification is provided (step 1008). After the logging of the data of the predetermined number of seconds for accumulation after the occurrence of defect, the logging process is temporarily stopped (step 1009). Note here that when the data after the occurrence of the defect is not needed for the diagnosis, without logging the data of the predetermined number of seconds for accumulation after the occurrence of the defect in step 1009, the logging process may be temporarily stopped when the defect notification is provided. When the log data retrieval request message is provided by the diagnostic equipment 101 (step 1010), by transmitting back the log data retrieval response message, the ECUs 102 and 103 each accumulate the log data of its own in the diagnostic equipment 101. When there is any log data not yet transmitted when the log data retrieval request message is provided (step 1011), the ECUs 102 and 103 each read the not-yet-transmitted log data from the head thereof, and the log data retrieval response message is created (step 1012). The resulting log data retrieval response message is forwarded to the vehicle network 100 (step 1013). Because the data in a message has the limitation of capacity, when the transmitting log data is large in capacity, the log data is divided into a plurality of messages for transmission. When the log data in storage is entirely transmitted to the diagnostic equipment 101 (when there is no not-yet-transmitted log data), the log data retrieval response message indicating as such (including information indicating that this is the last data) is created (step 1014), and the resulting log data retrieval response message is forwarded to the vehicle network 100 (step 1015). To indicate whether the log data retrieval response message is the last or not, for example, the log data section may be set to "0", or an area may be provided to explicitly indicate that the data is the last message. After the log data in storage is entirely transmitted, the log data is cleared (deleted), and the memory area is initialized before the logging process is resumed (step 1016).

As described above, according to the embodiment, the diagnostic equipment keeps track of whether or not the log data available for later use for defect diagnostic by the ECUs coupled to the vehicle network can be temporarily stored, and only from the ECU(s) not having the logging-available memory area, gathers the log data periodically, thereby being able to reduce the load of the network under the normal condition. On the other hand, when some defect is occurring, only from the ECU(s) having the logging-available memory area, any needed log data is collectively gathered, thereby being able to reduce the load of the network also when some defect is occurring.

Moreover, as a modified example of the embodiment, the ECUs each include a plurality of network interfaces, and form, for its own control, a sub network other than the vehicle network 100. When the sub network is coupled to one or more ECUs, the ECU coupled to the vehicle network 100 keeps track of information, e.g., yes or no whether there is a memory area for the log data for defect diagnosis use in each of the ECUs in its own sub network. Using information about each of the ECUs in the sub network, e.g., the sampling data length and period, its own memory capacity, and the number of seconds required for data accumulation from the diagnostic equipment, when the ECU determines as being able to store the log data of the one or more ECUs on its own sub network, the diagnostic equipment is notified thereof. By providing means for making a notification as such, the network load of the vehicle network 100 can be favorably reduced.

The specification and drawings are, accordingly, to be regarded in an illustrative rather than a restrictive sense. It will, however, be evident that various modifications and changes may be made thereto without departing from the spirit and scope of the invention as set forth in the claims.

We claim:

1. A vehicle-mounted information system, comprising:

a plurality of ECUs that transmit/receive control information to/from each other for controlling a vehicle over an in-vehicle network;

a device under the management and control of the ECUs; and a diagnostic equipment that gathers, for accumulation, the control information from the network through coupling thereto, wherein the diagnostic equipment includes:

means for determining whether the vehicle is defective or not based on the control information gathered from the network;

means for making an inquiry to each of the ECUs coupled to the network whether or not there is a memory for temporarily logging information for use with a control-target device thereof; and means for creating, when the vehicle is determined as being defective, a defect notification message with respect to any of the ECUs whose response against the inquiry is "yes", and transmitting the message to the network, and the ECUs each include:

means for managing internal information indicating whether a memory area can be reserved for logging the information for use with the device under the management and control of its own;

means for forwarding back the internal information to the diagnostic equipment in response to the inquiry coming over the network to see whether there is the memory;

means for accumulating, in the memory of its own, when the internal information includes information telling that "there is the memory area", the information to be transmitted/received to/from the control-target device of its own; and means for stopping, when the defect notification message is provided, after accumulating the information for use with the control-target device thereof for a predetermined length of time, the accumulation thereof.

2. The vehicle-mounted information system according to claim 1, wherein the diagnostic equipment includes means for gathering, with respect to any of the ECUs making a response of "no" against the inquiry whether there is the memory, information for use with the control-target device of the ECU at a predetermined period.

3. The vehicle-mounted information system according to claim 1, wherein the diagnostic equipment includes:

means for creating, with respect to any of the ECUs making a response of "yes" against the inquiry whether there is the memory, when the vehicle is determined as being defective, after a lapse of time of being able to reserve a preset amount of the log data after transmission of the defect notification message, a log data retrieval request message with respect to the ECU, and transmitting the message to the network;

means for receiving a log data retrieval response message being a response to the log data retrieval request message from the ECU; and means for accumulating, in an accumulation unit of its own, information found in the log data retrieval response message for use between the ECU and the control-target device thereof.

4. The vehicle-mounted information system according to claim 1, wherein the internal information indicating whether or not the memory area can be reserved for logging the information between the ECU and the control-target device thereof includes yes/no whether there is the memory area, the number of seconds required for accumulation of the log data, a sampling data format of the log data, a sampling period, and a sampling data length.

5. The vehicle-mounted information system according to claim 1, wherein the ECUs each include means for assigning, when including the memory area, a predetermined mark to the log data being the latest when receiving the defect notification message, the diagnostic equipment includes means for determining whether the mark is provided or not to the log data retrieval response message provided by the ECU as a response to the log data retrieval request message of its own, and the log data retrieval response message includes a flag indicating a storage location of the log data provided with the mark at a head of a data section.

6. The vehicle-mounted information system according to claim 1, wherein the network is configured by a plurality of networks, the ECUs respectively include a plurality of network interfaces, and each configure a sub network with any of the ECUs related thereto, and the ECUs each include:

means for managing the internal information of any other of the ECUs coupled to the sub network thereof; and means for making, when receiving a memory inquiry request from the diagnostic equipment, a response thereto substituting for the internal information of the any other of the ECUs.

7. A method for gathering vehicle-mounted information by a plurality of ECUs that transmit/receive control information to/from each other for controlling a vehicle over an in-vehicle network, a device under the management and control of the ECUs, and a diagnostic equipment that gathers and accumulates the control information from the network through coupling thereto, the method comprising the steps of:

by the diagnostic equipment, determining whether the vehicle is defective or not based on the control information gathered from the network;

making an inquiry to each of the ECUs coupled to the network whether there is a memory for temporarily logging information for use with a control-target device thereof; and creating, when the vehicle is determined as being defective, a defect notification message with respect to any of the ECUs whose response to the inquiry is "yes", and transmitting the message to the network, and by each of the ECUs, managing internal information indicating whether a memory area can be reserved for logging the information for use with the control-target device of its own;

forwarding back the internal information to the diagnostic equipment in response to the inquiry coming over the network to see whether there is the memory;

accumulating, in the memory of its own, when the internal information includes information telling that "there is the memory area", the information to be transmitted/received to/from the control-target device of its own; and stopping, when the defect notification message is provided, after the information for use with the control-target device thereof is accumulated for a predetermined length of time, the accumulation thereof.

8. A diagnostic equipment that is coupled to an in-vehicle network coupled with a plurality of ECUs for controlling a device mounted in a vehicle, and collects, for accumulation, information for use between the ECUs and the device, the diagnostic equipment comprising:

means for making an inquiry to each of the ECUs whether or not to have a memory capacity for accumulating the information for use with the device;

means for gathering, not from any of the ECUs having the memory capacity but from any of the ECUs not having the memory capacity, the information for use between the ECU and the device at the predetermined period, and accumulating the information in an accumulation unit of its own; and means for collectively gathering, when the vehicle is determined as being defective, from the ECU having the memory capacity, the information for use between the ECU and the device accumulated in a memory of the ECU before and after when a defect is determined as occurring, and accumulating the information in the accumulation unit of its own.

* * * * *